US012657796B2

(12) United States Patent
Chan et al.

(10) Patent No.: US 12,657,796 B2
(45) Date of Patent: Jun. 16, 2026

(54) CONVOLUTIONAL NEURAL NETWORK FOR DYNAMIC PET FRAME CLUSTERING

(71) Applicant: CANON KABUSHIKI KAISHA, Tokyo (JP)

(72) Inventors: Chung Chan, Vernon Hills, IL (US); Li Yang, Vernon Hills, IL (US); Xiaoli Li, Vernon Hills, IL (US); Wenyuan Qi, Vernon Hills, IL (US); Evren Asma, Vernon Hills, IL (US); Jeffrey Kolthammer, Vernon Hills, IL (US)

(73) Assignee: CANON KABUSHIKI KAISHA, Tokyo (JP)

( * ) Notice: Subject to any disclaimer, the term of this patent is extended or adjusted under 35 U.S.C. 154(b) by 712 days.

(21) Appl. No.: 17/878,413

(22) Filed: Aug. 1, 2022

(65) Prior Publication Data

US 2024/0037814 A1 Feb. 1, 2024

(51) Int. Cl.
_G06T 11/00_ (2026.01)
_G06T 12/10_ (2026.01)

(52) U.S. Cl.
CPC ........ _G06T 12/10_ (2026.01); _G06T 2211/412_ (2013.01)

(58) Field of Classification Search
CPC .......................... G06T 11/005; G06T 2211/412
See application file for complete search history.

(56) References Cited

U.S. PATENT DOCUMENTS

| | | | | |
|---|---|---|---|---|
| 11,983,869 | B2 * | 5/2024 | Hébert | G06T 7/0012 |
| 2015/0036904 | A1 * | 2/2015 | Jerebko | G06T 11/005 |
| | | | | 382/131 |
| 2018/0174360 | A1 * | 6/2018 | Feng | A61B 6/00 |
| 2019/0008468 | A1 | 1/2019 | Liu et al. | |
| 2020/0175675 | A1 | 6/2020 | Ogino et al. | |
| 2023/0316726 | A1 * | 10/2023 | Selinger | G06V 10/7792 |
| | | | | 382/159 |

FOREIGN PATENT DOCUMENTS

| | | |
|---|---|---|
| EP | 3 273 387 A1 | 1/2018 |
| WO | WO 2018/083464 A1 | 5/2018 |

OTHER PUBLICATIONS

William Whiteley, et al., "FastPET: Near Real-Time Pet Reconstruction from Histo-Images Using a Neural Network", Preprint Submitted IEEE Transactions on Radiation & Plasma Medical Sciences, arXiv:2002.04665v2 [eess.IV], vol. 5, Issue 1, Jan. 2021, pp. 65-77.

(Continued)

_Primary Examiner_ — Michael J Vanchy, Jr.

(74) _Attorney, Agent, or Firm_ — Oblon, McClelland, Maier & Neustadt, L.L.P.

(57) ABSTRACT

A dynamic frame reconstruction apparatus and method for medical image processing is disclosed which reduces the computationally expensive reconstruction of images but which retains the accuracy of the image reconstruction. A convolutional neural network is used to cluster the dynamic data into groups of frames, each group sharing similar radiotracer distribution. In one embodiment, groups of frames that have similar reconstruction parameters are determined, and scatter and random estimations are computed once and shared among each of the frames in the same frame group.

18 Claims, 10 Drawing Sheets

(56)          References Cited

OTHER PUBLICATIONS

Maurice Roux, "A Comparative Study of Divisive and Agglomerative Hierarchical Clustering Algorithms", Journal of Classification, vol. 35, No. 2, 2018, pp. 345-366.

Benjamin C. Lee, et al., "Optimization of temporal sampling for $^{82}$rubidium PET myocardial blood flow quantification", Journal of Nuclear Cardiology, vol. 24, No. 5, May 15, 2017, pp. 1517-1529.

Elie Aljalbout, et al., "Clustering with Deep Learning: Taxonomy and New Methods", arXiv:1801.07648v2 [cs.LG], Sep. 13, 2018, pp. 1-12.

Xuezhu Zhang, et al., "Total-Body Dynamic Reconstruction and Parametric Imaging on the uEXPLORER", The Journal of Nuclear Medicine, vol. 61, No. 2, Feb. 2020, pp. 285-291.

Silin Ren, et al., "Data-driven event-by-event respiratory motion correction using TOF PET list-mode centroid of distribution", Physics in Medicine & Biology, vol. 62, No. 12, Jun. 21, 2017, pp. 4741-4755 (Abstract only).

Extended European Search Report issued Jan. 8, 2024 in European Patent Application No. 23189007.0, 10 pages.

Alqahtani et al., "Deep Time-Series Clustering: A Review", Electronics, vol. 10, No. 23, Dec. 2, 2021, 29 pages.

Matsubara et al., "A review on AI in PET imaging", Annals of Nuclear Medicine, vol. 36, No. 2, Jan. 14, 2022, pp. 133-143.

\* cited by examiner

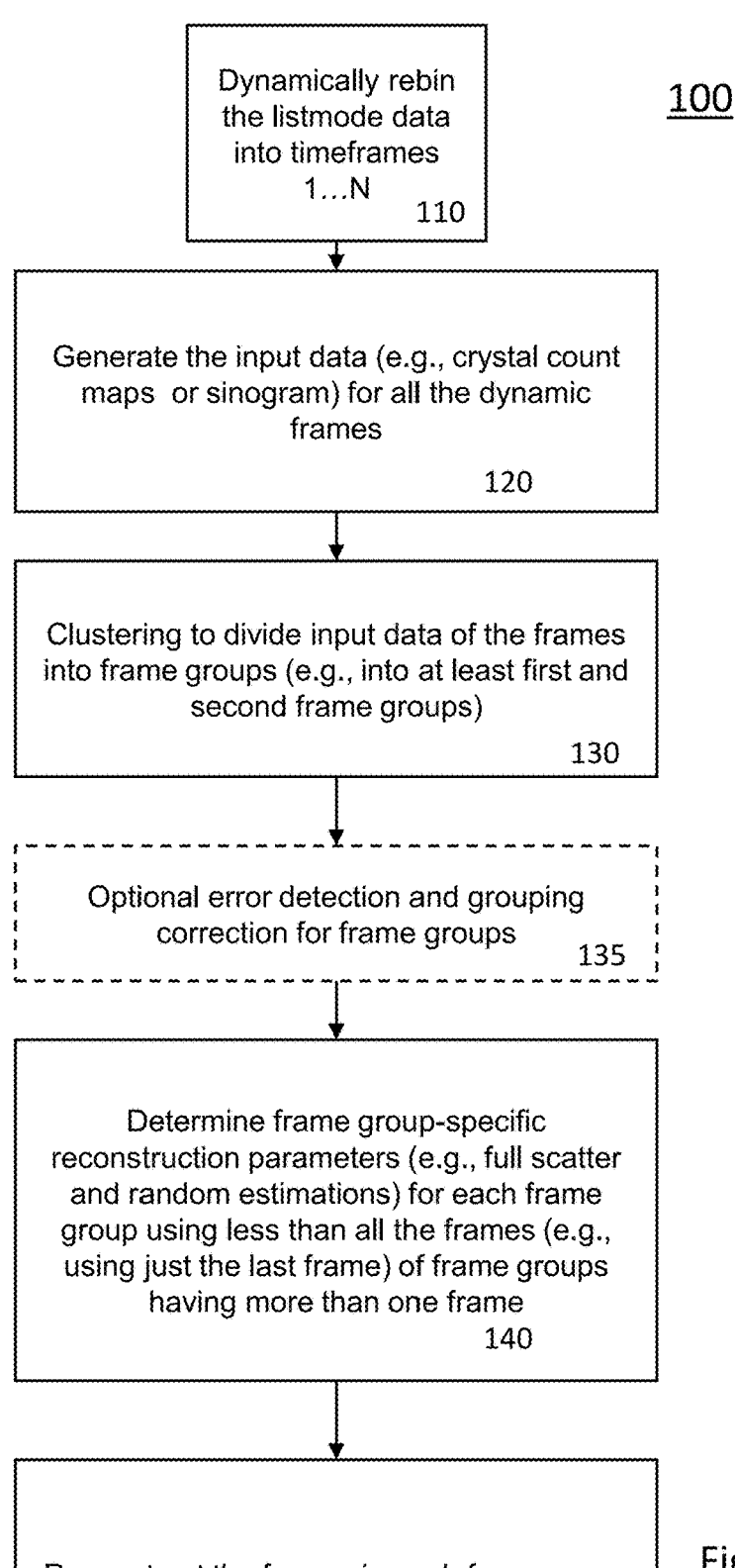

100

Dynamically rebin
the listmode data
into timeframes
1...N
110

Generate the input data (e.g., crystal count
maps  or sinogram) for all the dynamic
frames
120

Clustering to divide input data of the frames
into frame groups (e.g., into at least first and
second frame groups)
130

Optional error detection and grouping
correction for frame groups
135

Determine frame group-specific
reconstruction parameters (e.g., full scatter
and random estimations) for each frame
group using less than all the frames (e.g.,
using just the last frame) of frame groups
having more than one frame
140

Reconstruct the frames in each frame group
using the frame group-specific full scatter
and random estimations
150

Figure 1

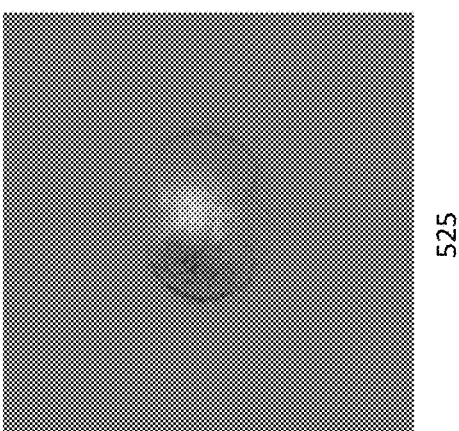
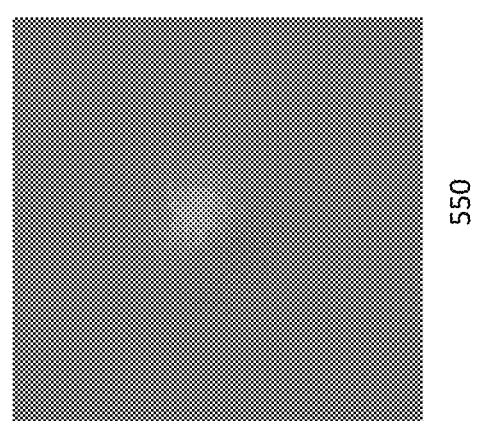
525
550
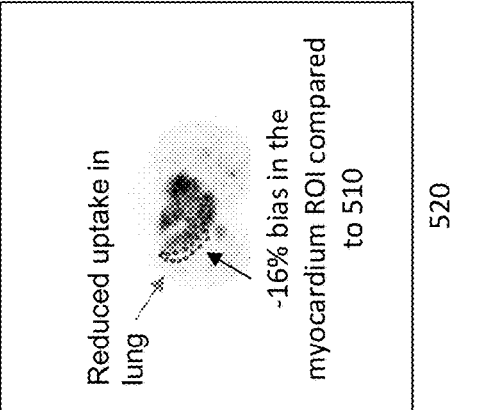
Reduced uptake in lung
-16% bias in the myocardium ROI compared to 510
520
FIG. 5A
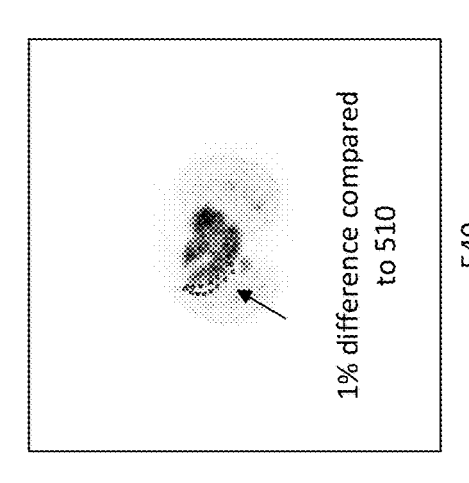
1% difference compared to 510
540
FIG. 5B
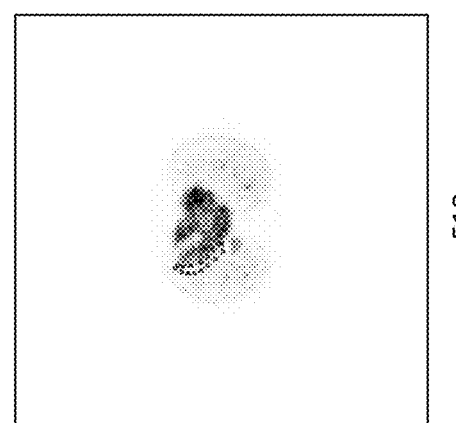
510
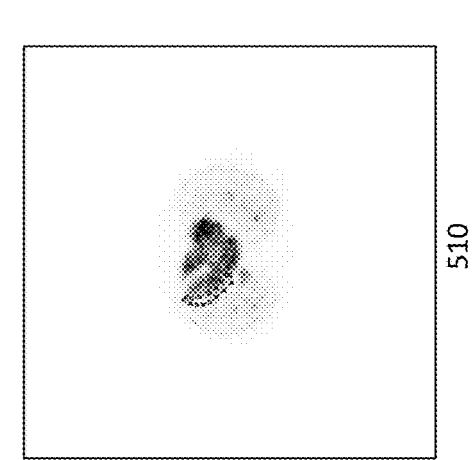
510

CONVOLUTIONAL NEURAL NETWORK FOR DYNAMIC PET FRAME CLUSTERING

FIELD

The present disclosure is directed to an apparatus and method for providing improved processing speed for generating medical images, and in one embodiment to an apparatus and method for receiving list-mode data corresponding to a plurality of detection times during Positron Emission Tomography (PET) imaging and producing resulting PET images through reconstruction in a computationally efficient fashion.

BACKGROUND

One obstacle of acquiring dynamic images in clinical practice is the computational time needed to reconstruct a large amount of fine sampled images. This can range from 20-30 images for Rb-82 MBF application according to *Optimization of temporal sampling for 82rubidium PET myocardial blood flow quantification* by Lee, B C, et al., Journal Nuclear Cardiology. 2017; 24(5):1517-1529 (incorporated herein by reference) to 187 images in whole-body F-18 FDG dynamic imaging according to *Total-Body Dynamic Reconstruction and Parametric Imaging on the uEXPLORER*. Zhang, X, et al., J. Nuclear Med. 2020 February; 61(2):285-291, the contents of which are incorporated herein by reference.

In conventional dynamic frame reconstruction, scatter and random estimations have to be computed during the reconstruction for each of the dynamic frames, which is one of the most computationally expensive module in the reconstruction.

Dynamic nuclear medicine image acquisition over time can provide spatiotemporal distribution of radiotracers in vivo. By reconstructing the dynamic list-mode data into short time frames (e.g., 1-second/frame), the radiotracer uptake can be measured in each voxel, or in a region of interest over time to provide a time activity curve. Kinetic modeling can then be used to extract physiological and biological useful information, such as glucose metabolism in oncology imaging, or myocardial blood flow in cardiac imaging, etc.

SUMMARY

Known systems do not provide a dynamic frame reconstruction method which reduces the computationally expensive reconstruction of images, but which retains the accuracy of the image reconstruction. One such technique for doing so is described herein. In one embodiment thereof, groups of frames (referred to as frame groups) that have similar reconstruction parameters are determined, and scatter and random estimations may be computed once, and shared among each of the frames in the same frame group.

According to one aspect of the present disclosure, clustering is used to group frames into frame groups. In one embodiment thereof, dynamic input data, such as determined from PET listmode data of a single uptake, is divided into a plurality of short dynamic frames 1 . . . N, and frames of input data are then generated for all of the plurality of dynamic frames. The frames of input data are then assigned to different frame groups (e.g., through clustering), with each group member sharing a similar group-specific reconstruction parameter.

In addition to pre-reconstruction data (e.g., crystal count maps or sinograms), which can be used as the plurality of frames, the clustering can be performed on other data as well, such as preview reconstruction data without scatter correction. In addition, a centroid-of-distribution approach that back-projects each of the events to the center of the time-of-flight kernel as described in *Data-driven event-by-event respiratory motion correction using TOF PET list-mode centroid of distribution*. Ren, S., et al., Phys Med Biol. 2017 Jun. 21; 62(12):4741-4755, incorporated herein by reference, may also be used to generate a rough estimation of the radiotracer distribution.

After frames are assigned to the corresponding frame groups, at least one representative frame of each group is then used to determine a frame group-specific reconstruction parameter (e.g., scatter and/or random estimations), and the frames in each group are then reconstructed using the group-specific reconstruction parameter of the group. Such a configuration reduces the computation time for dynamic PET reconstruction, while retaining significant accuracy of the resulting image. This also allows the clinician to potentially decrease the time to diagnosis as well as to increase overall patient throughput on the machine.

In one embodiment, the present disclosure is related to a non-transitory computer-readable storage medium storing computer-readable instructions that, when executed by a computer, cause the computer to perform a method for reconstructing a positron emission tomography image in a computationally efficient manner.

Note that this summary section does not specify every embodiment and/or incrementally novel aspect of the present disclosure or claimed invention. Instead, this summary only provides a preliminary discussion of different embodiments. For additional details and/or possible perspectives of the invention and embodiments, the reader is directed to the Detailed Description section and corresponding figures of the present disclosure as further discussed below.

BRIEF DESCRIPTION OF THE DRAWINGS

FIG. 1 shows a flow block diagram of the disclosed method of rebinning listmode data into a plurality of timesframes, clustering input data corresponding to the plurality of timeframes into frame groups, determining at least one group-specific reconstruction parameter from at least one of the frames (e.g., the last frame) in each of the frame groups, and performing reconstruction of all the frames in a frame group using the at least one group-specific reconstruction parameter for the frame group;

4B) but in which each crystal count map is used to generate its own encoder/decoder network of n epochs and the resulting latent features generated from the $n^{th}$ epoch are used for clustering.

Figure 6:
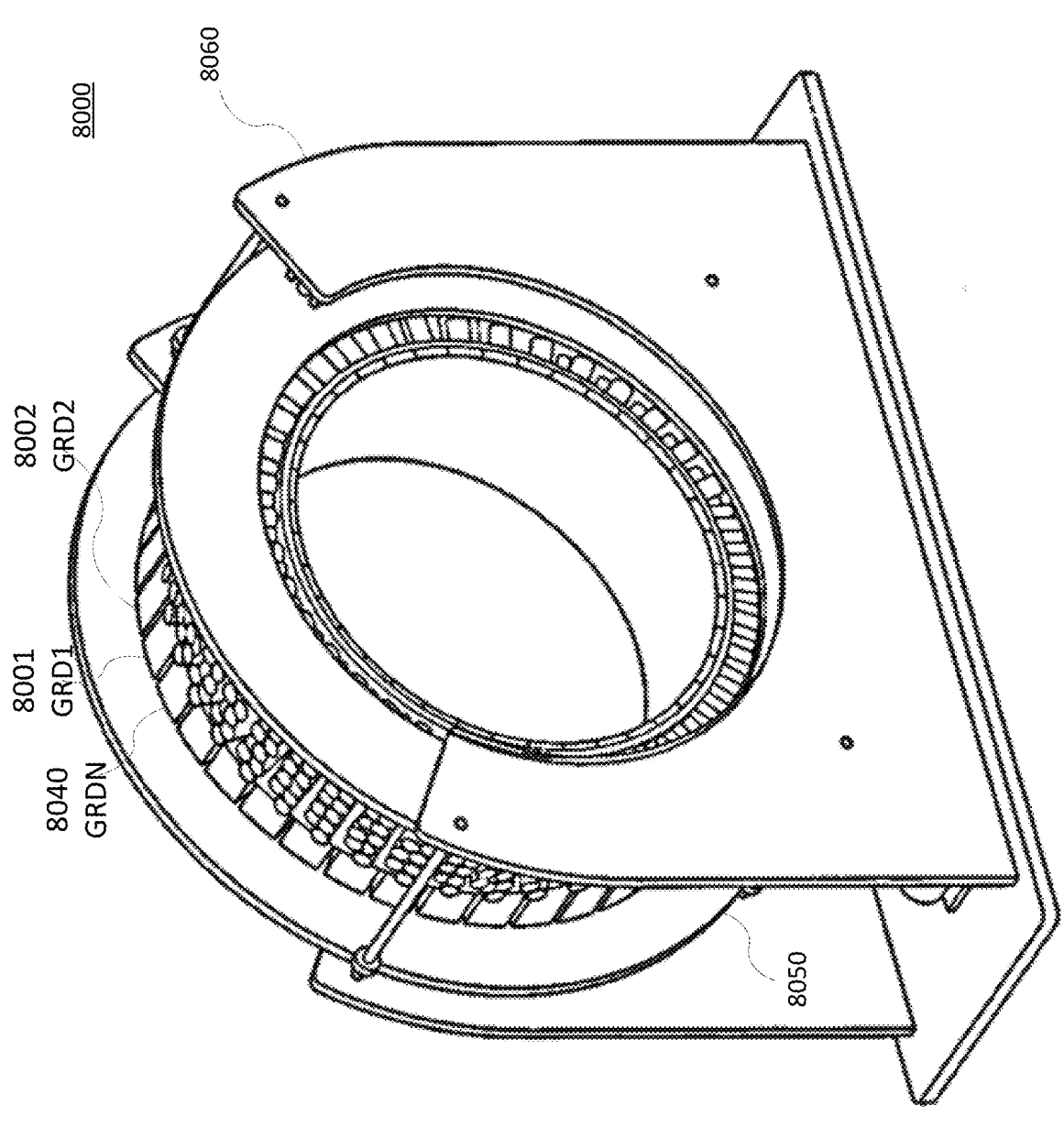
Figure 7:
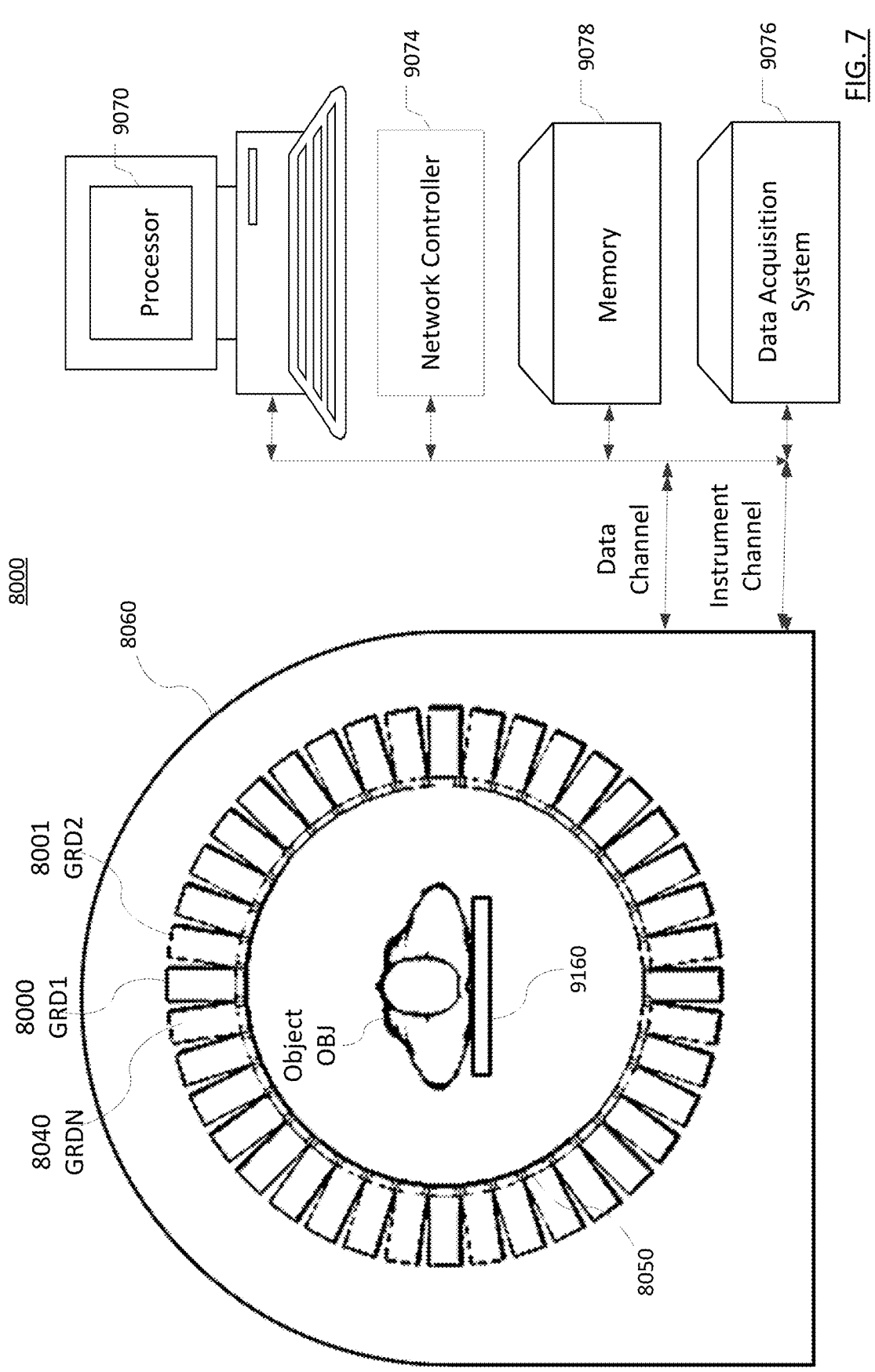

FIG. 5A shows a frame reconstruction of an exemplary frame using a reconstruction parameter outside of the frame group of the frame to be reconstructed;

FIG. 5B shows a frame reconstruction of an exemplary frame using a reconstruction parameter within the frame group of the frame to be reconstructed;

FIG. 6 is an illustration of a perspective view of a PET scanner, according to an exemplary embodiment of the present disclosure; and FIG. 7 is a schematic of a PET scanner and associated hardware, according to an exemplary embodiment of the present disclosure.

DETAILED DESCRIPTION

In nuclear medical imaging, PET scans are subject to scattering that reduces image quality. In addition, the time to process and reconstruct the image is computationally expensive when including scatter correction. In order to correct for the scatter, a real-time reconstruction process is described herein that clusters similar image frames into frame groups and uses a single frame group-specific reconstruction parameter (e.g., scatter estimation) on any frame within the frame group.

FIG. 1 shows a flow diagram of an exemplary method 100 in which frames are dynamically rebinned into frame groups, and a representative frame in each of the frame groups is used to determine a frame group-specific reconstruction parameter for its corresponding frame group. The method 100 starts with step 110 where listmode data is dynamically rebinned (or assigned or divided) into a plurality of sequential timeframes (e.g., with each timeframe being a fixed interval such as 10 s/timeframe all from the same examination) over the course of a single scan procedure (i.e., part of the same study/examination). In step 120, input data (e.g., a crystal count map or a sinogram) acting as frames is generated from the list mode data for the generated timeframes. In step 130, the frames are divided (e.g., using convolutional neural network (CNN) clustering) into frame groups. The frames are grouped such that all the frames in the frame group share a frame group-specific reconstruction parameter (e.g., scatter and random estimations) that may be computed once and shared among the frames of the frame group. Further, within each group, the dynamic frames should share a similar radiotracer distribution in the final reconstructed images.

In optional step 135, error detection and correction can be used to ensure that the groupings are consistent with a physical model that represents how uptake should occur in a patient being scanned.

In FIG. 1, in step 140, frame group-specific reconstruction parameters (e.g., full scatter and random estimations) are determined for each frame group. That is, first and second frame group-specific reconstruction parameters based on (1) frames in first frame group and (2) frames in the second frame group, respectively, are estimated, wherein the first and second frame group-specific reconstruction parameters are different. For frame groups having more than one frame, less than all the frames (e.g., using just the last frame) are used to determine the frame group-specific reconstruction parameters. In an alternate embodiment, for frame groups having more than one frame, a combination of frames (e.g., an average of frames) can be calculated for less than all of the frames in the frame group.

As shown in step 150, the frames in each frame group are reconstructed using the same frame group-specific reconstruction parameter.

Figure 2A:
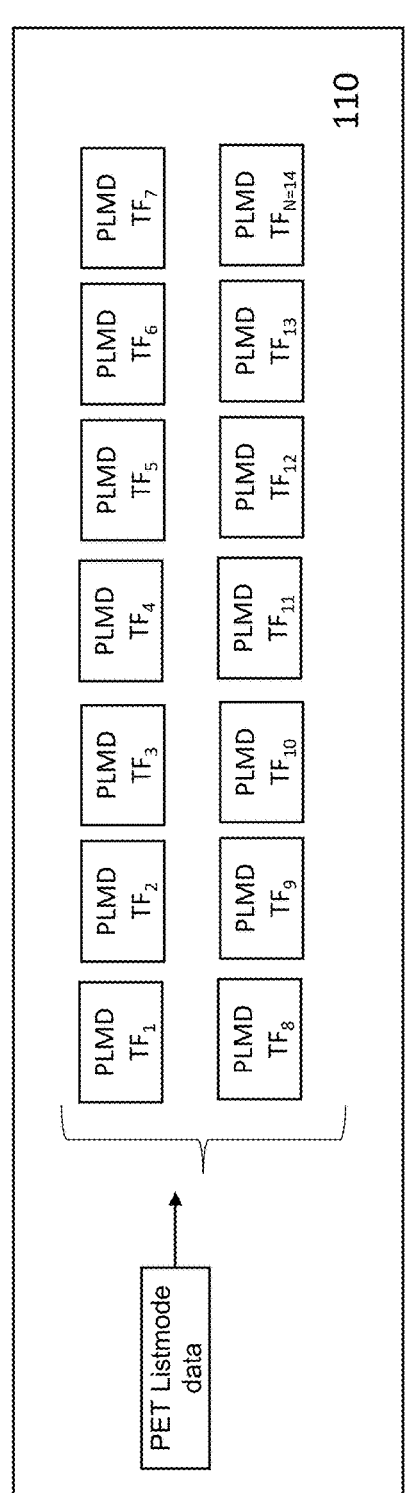
FIGS. 2A-2D show exemplary steps from FIG. 1 more detailed an embodiment of the method which uses a crystal count map determined from listmode data which is used as input to the CNN.
Figure 2B:
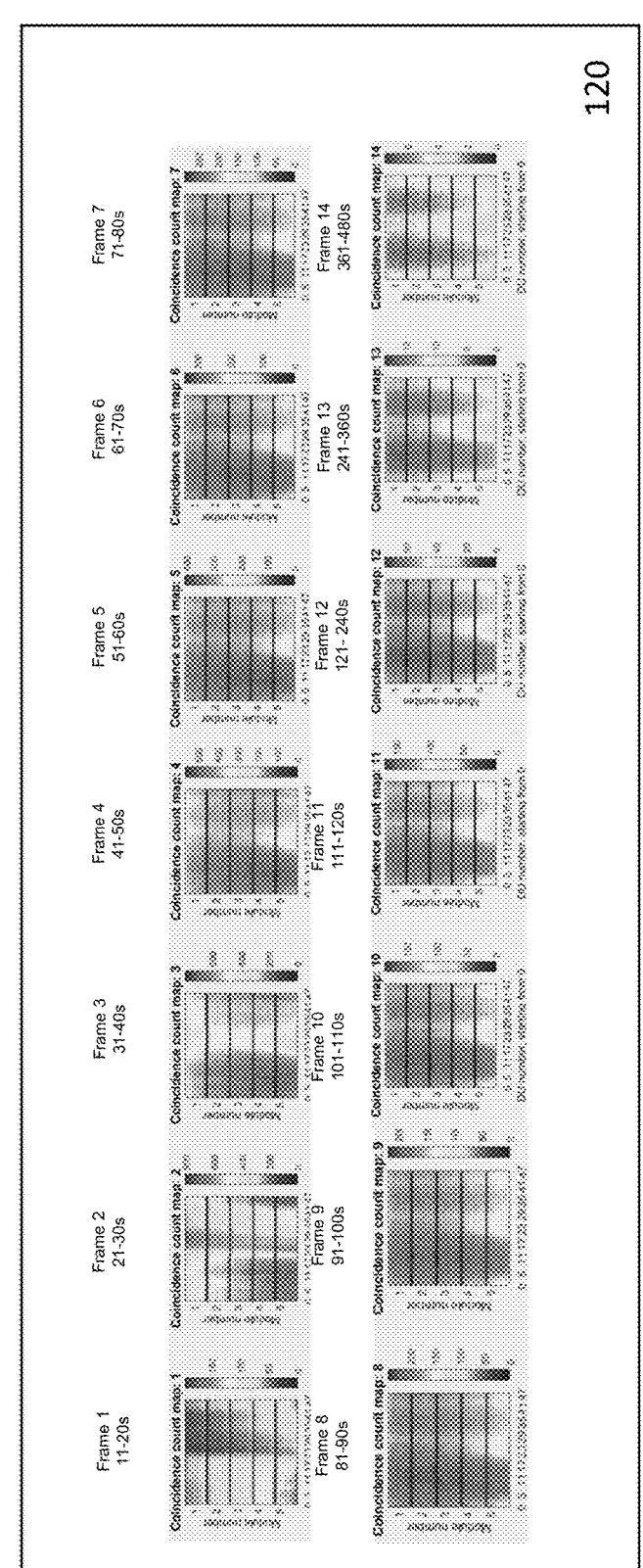

FIG. 2A shows a graphic illustration of step 110 in which listmode data is dynamically rebinned (or assigned or divided) into a plurality of timeframes $TF_x$ (e.g., with each timeframe being (1) a fixed interval such as 10 s/timeframe or (2) a varying timeframe) over the course of a scan procedure (e.g., lasting 480 seconds). FIG. 2B shows an embodiment where the input data generated in step 120 is a series of crystal count maps for fourteen corresponding time frames $TF_1$ to $TF_{N=14}$. That is, the crystal count maps show a sum of a number of detection events at each of the crystal positions of a corresponding crystal. As would be appreciated by those of skill in the art, multiple crystals can be concatenated to form a larger virtual crystals whose detection events are counted. As shown in FIG. 2B, not all timeframes need to be of a same length. $TF_1$ is illustrated as being of length 10 seconds whereas $TF_{N=14}$ is illustrated as being of length 120 s.

Figure 2C:
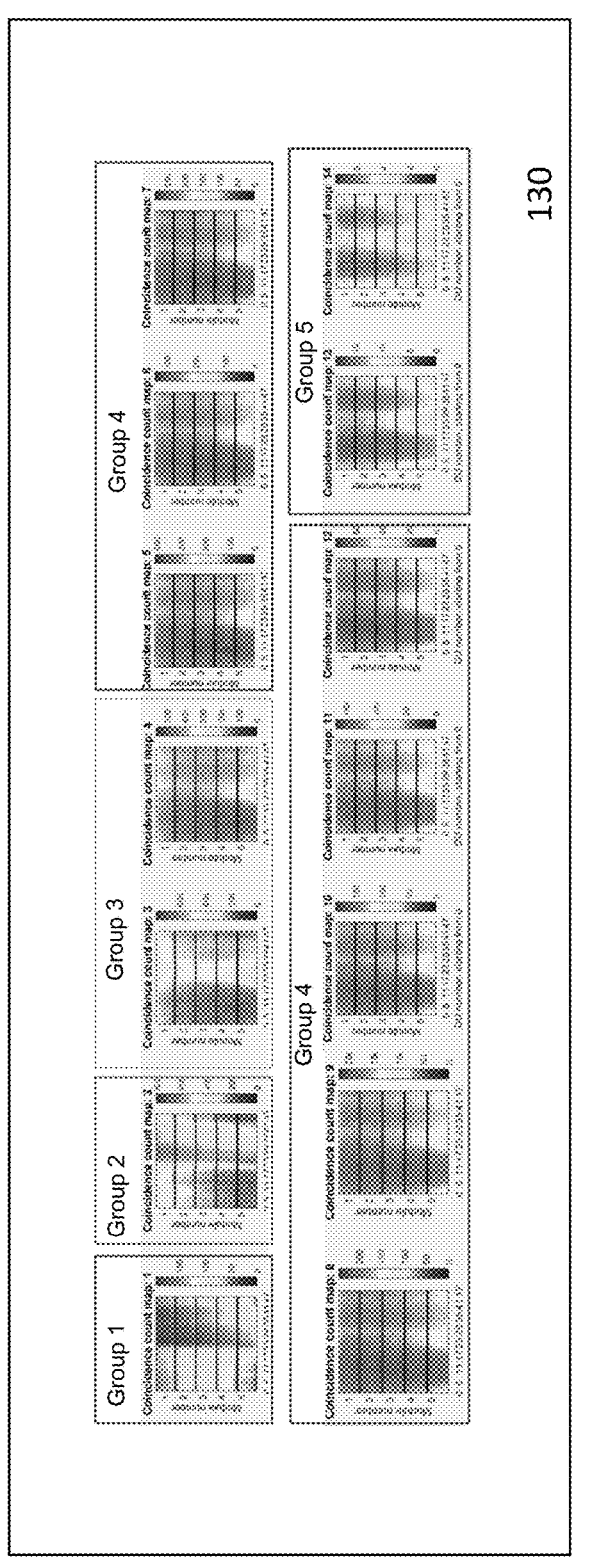

FIG. 2C shows a result of step 130 grouping the frames into frames having similar crystal count maps, thereby forming 5 different frame groups. The frames assigned to the 5 illustrated frame groups are: group 1: {Frame 1}, group 2: {Frame 2}, group 3: {Frames 3-4}, group 4: {Frames 5-12}, and group 5: {Frames 13-14}. As noted above, the lengths of the corresponding timeframes need not be the same.

Figure 2D:
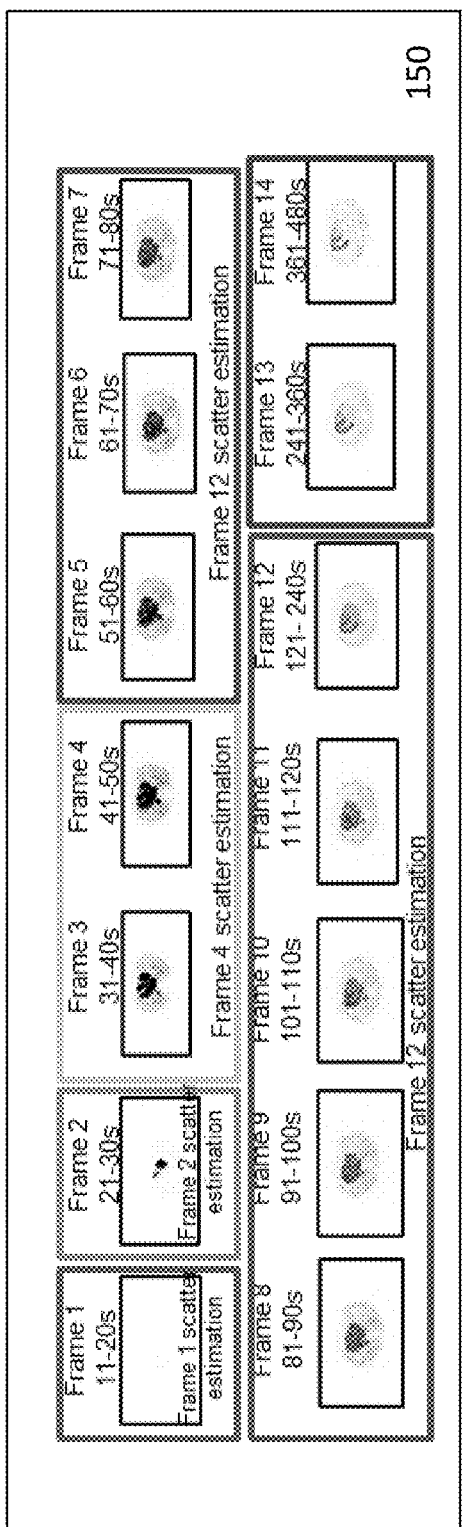

FIG. 2D shows a result of step 150 whereby the frames in each frame group are reconstructed using the same frame group-specific reconstruction parameter for the corresponding frame group.

Figure 3:
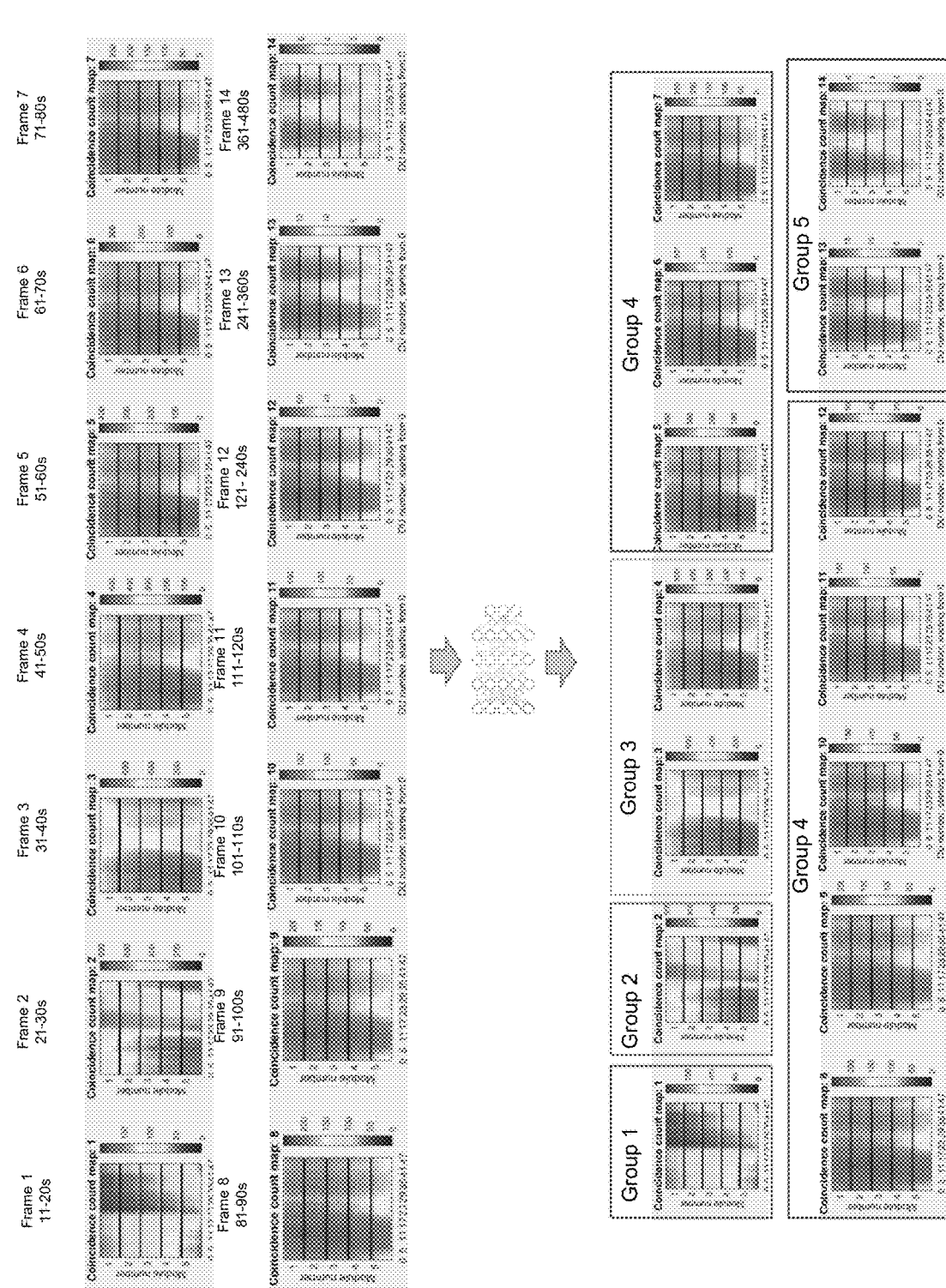
FIG. 3 shows a flow diagram of crystal count maps (acting as frames) being applied to a neural network to performing clustering of the crystal count maps into frame groups.

FIG. 3 shows a flow diagram of crystal count maps (acting as frames) being applied to a neural network to performing clustering of the crystal count maps into frame groups such as is performed in step 130. In one embodiment, the clustering is achieved by using a deep-learning CNN for feature extraction and dimensionality reduction, followed by a clustering algorithm applied to the learned representations. For example, an auto-encoder neural network can be used for feature extraction with a reconstruction loss, i.e., minimize the L2 norm, during a training phase, with known labels (same as inputs), as discussed below with respect to FIG. 4A. Further, in a testing phase, the decoder of the auto-encoder is removed, and the latent features generated by the encoder portion of the auto-encoder are sequentially fed into a clustering algorithm, such as a hierarchical agglomerative clustering algorithm, e.g. using Matlab or Machine Learning Toolbox, which does not require a predetermined number of clusters for clustering. See FIG. 4B.

Figure 4A:
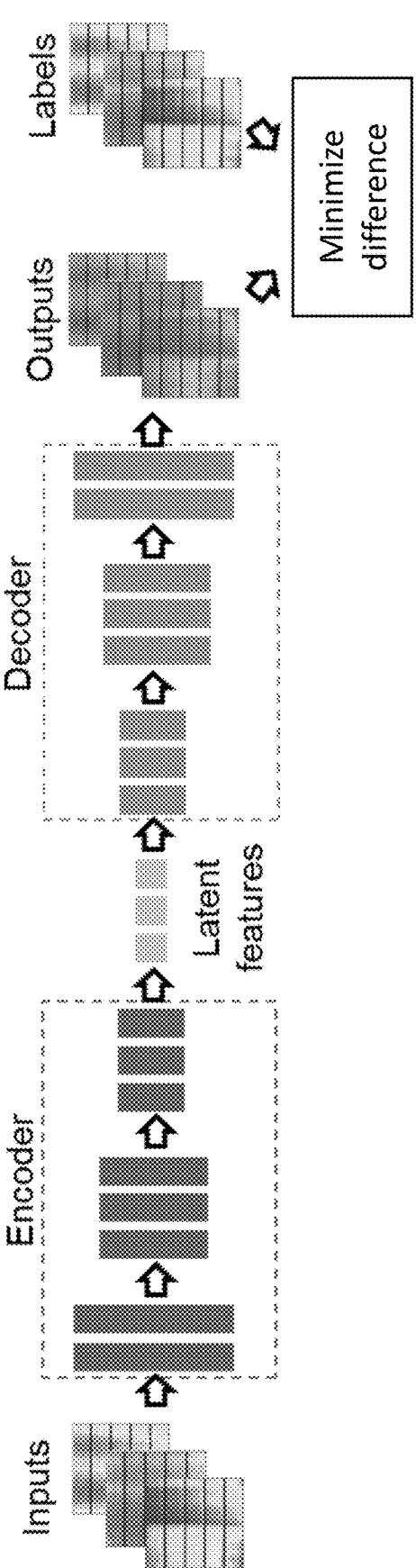
FIG. 4A shows a neural network (an encoder/decoder network) being trained to produce latent features from a set of crystal count maps and regenerate an approximation of the original crystal count map from the latent features.

As shown in FIG. 4A, an auto-encoder neural network (having an encoder and a decoder) can be trained to produce latent features from a set of crystal count maps, and regenerate an approximation of the original crystal count map from the latent features. In one embodiment, the encoder/decoder network is a neural network that extracts input image features then rebuilds the input image from the extracted features. The encoder network includes convolution layers as well as sets of pooling layers. The convolution layers transform the image using the convolution process. The convolution layer can be described as a series of digital filters. The layer of pooling transforms the neighboring pixels into a single pixel. The pooling layer then decreases the image dimension. In general, the auto-encoder is trained to minimize the difference between the output of the auto-encoder and the original images (which are simultaneously used as input images and training labels). The network is run through a sufficient number of training epochs to reduce the difference between the outputs and the labels to below a threshold.

Figure 4B:
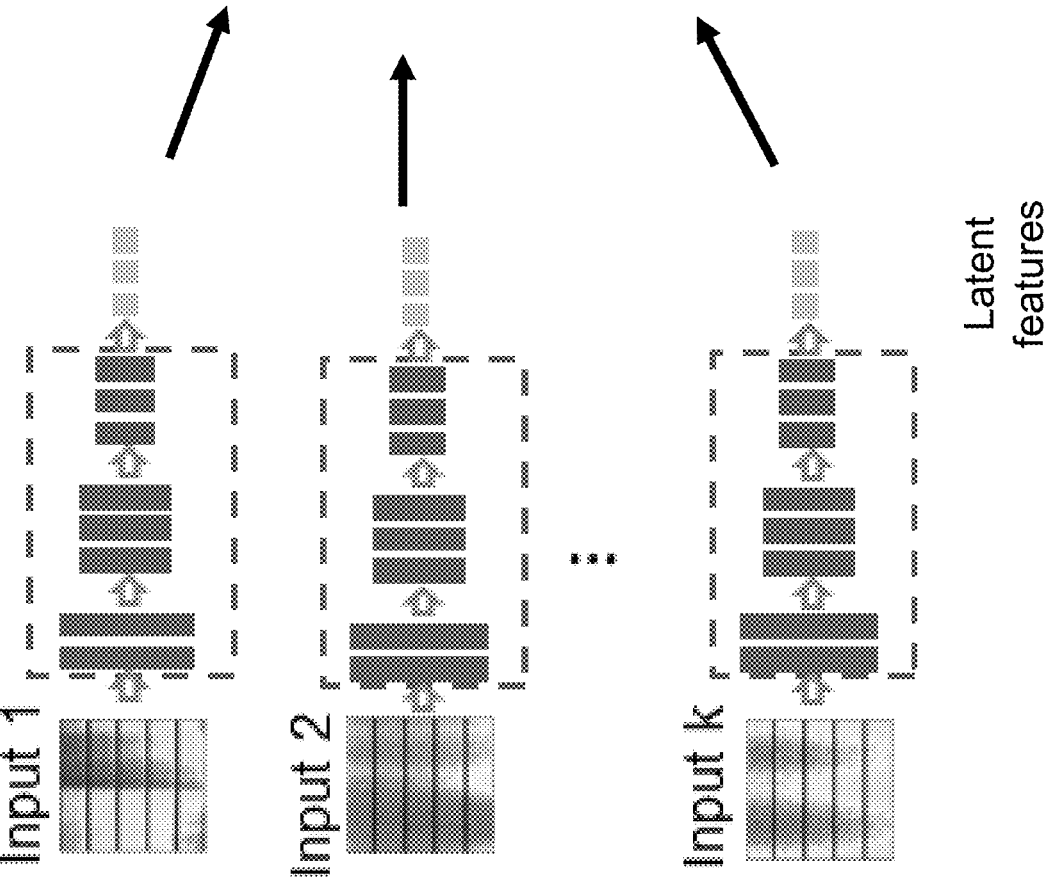
FIG. 4B shows a neural network trained using the method of FIG. 4A being used to generate latent features that are used to group the frames rather than grouping the frames using the crystal count maps directly.

FIG. 4B shows a neural network trained using the method of FIG. 4A being used to generate latent features (without needing the decoder portion of the network anymore), and the latent features are then used to group the frames, rather than grouping the frames using the crystal count maps directly. As shown in FIG. 4B, the latent features can be clustered using any neural network or using a non-neural network-based clustering method. As noted above, in one embodiment, the latent features generated by the encoder is sequentially fed into hierarchical agglomerative clustering algorithm, which does not require a predefined number of clusters, for clustering.

Figure 4C:
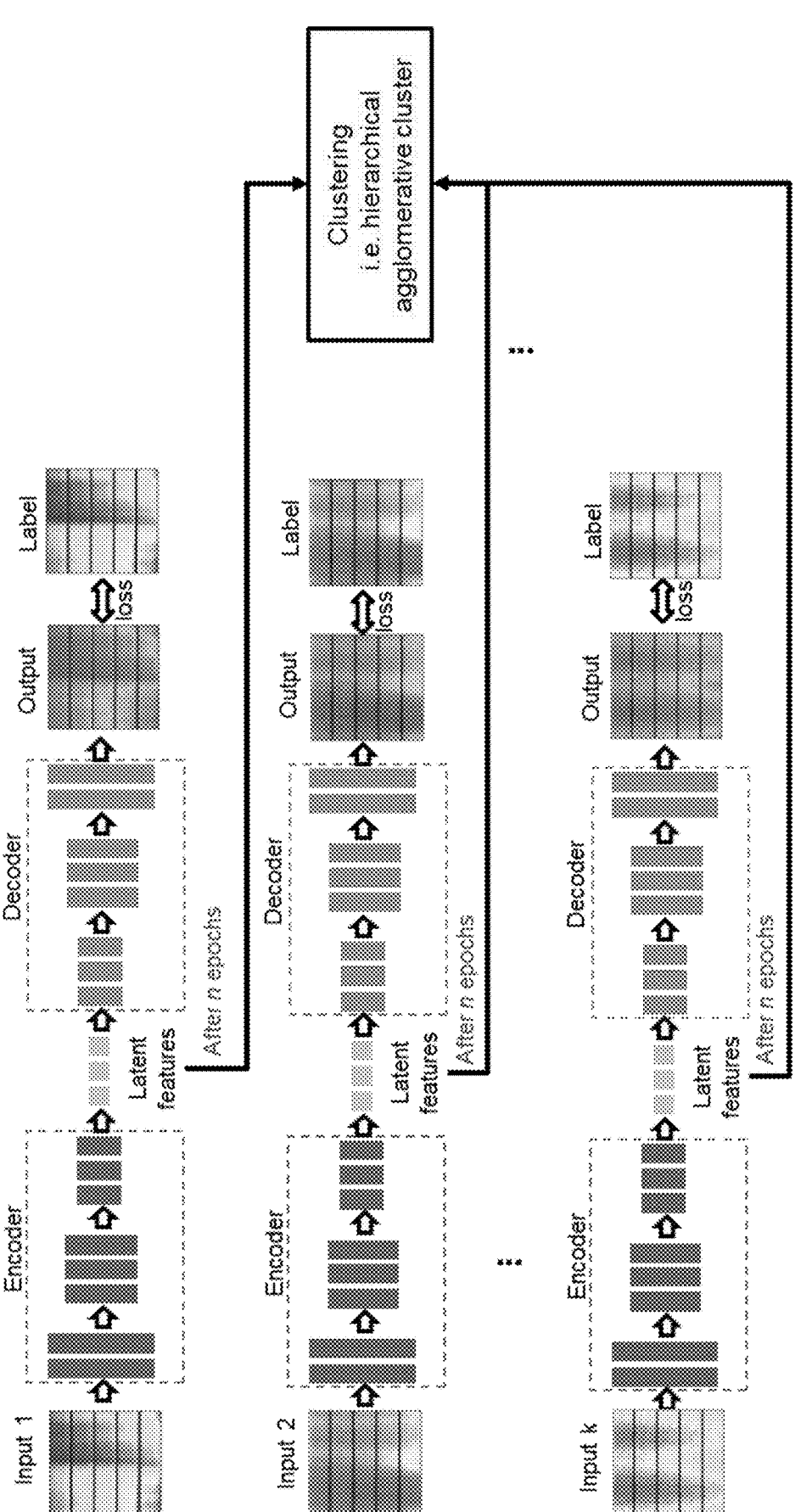
FIG. 4C shows clustering being performed in a self-supervised fashion (using a series of encoder/decoder networks similar to the single encoded/decoder network of FIG.

FIG. 4C shows an additional alternate embodiment. In FIG. 4C, clustering is performed in a self-supervised fashion (using a series of auto-encoder networks similar to the single auto-encoder network of FIG. 4B), but in which each crystal count map is used to generate its own encoder/decoder network over n epochs and the resulting latent features for each network generated from the $n^{th}$ epoch are used for clustering. The clustering may be a clustering technique such as a hierarchical agglomerative clustering technique.

FIG. 5A shows a portion of a comparative frame reconstruction of an exemplary frame. Image 510 shows a reconstruction using self-scatter estimation as the ground truth for exemplary Frame 3. Image 520 shows frame 3 reconstruction using a scatter estimation corresponding to frame 14 (which is outside of the corresponding frame group). A bias of 16% as compared to the self-scatter estimation image 510 is obtained as shown in image 520. Image 525 is a difference image between images 510 and 520 and shows large bias in lung and myocardium due to inaccurate scatter estimation.

FIG. 5B shows a more accurate frame reconstruction based on the method described herein. Image 540 shows a Frame 3 reconstruction image using group scatter estimation based on the clustering result of FIG. 2D. A bias of approximately 1% is achieved as compared to the self-scatter image 510. Image 550 is a difference image between images 510 and 540 and shows reduced bias in lung and myocardium as compared to image 520.

In one embodiment, it can be appreciated that the methods of the present disclosure may be implemented within a PET scanner, as shown in FIG. 6 and FIG. 7. Therefore, FIG. 6 and FIG. 7 show a PET scanner 8000 including a number of gamma-ray detectors (GRDs) 8001, 8002 . . . 8040 (e.g., GRD1, GRD2, through GRDN) that are each configured as rectangular detector modules. The PET scanner 8000 may be an adaptive axial Field of View (aaFOV) PET scanner, as introduced above. According to one implementation, each PET detector ring, which forms a cylindrical bore 8050 about a gantry 8060 includes, for example, 40 GRDs. In another implementation, there are 48 or more GRDs, the higher number of GRDs being used to create a larger bore size for the PET scanner 8000. As in the present disclosure, each PET detector ring may be independently translatable about an axial length of the aaFOV PET scanner. The translation of each PET detector ring may be accomplished by manual manipulation and/or motorized manipulation. The GRDs include scintillator crystal arrays for converting the gamma rays into scintillation photons (e.g., at optical, infrared, and ultraviolet wavelengths), which are detected by photodetectors. Each GRD can include a two-dimensional array of individual detector crystals, which absorb gamma radiation and emit scintillation photons. The scintillation photons can be detected by a two—dimensional array of photomultiplier tubes (PMTs) that are also arranged in the GRD. A light guide can be disposed between the array of detector crystals and the PMTs. Further, each GRD can include a number of PMTs of various sizes, each of which is arranged to receive scintillation photons from a plurality of detector crystals. Each PMT can produce an analog signal that indicates when scintillation events occur, and an energy of the gamma ray producing the detection event. Moreover, the photons emitted from one detector crystal can be detected by more than one PMT, and, based on the analog signal produced at each PMT, the detector crystal corresponding to the detection event can be determined using Anger logic and crystal decoding, for example. However, Anger arithmetic is not necessarily required when there is a one-to-one correspondence between the crystals and the photodetectors.

FIG. 7 shows a schematic view of a PET scanner system having GRDs 8001, 8002 . . . 8040 arranged to detect gamma-rays emitted from an object OBJ. The GRDs can measure the timing, position, and energy corresponding to each gamma-ray detection. In one implementation, the gamma-ray detectors are arranged in a PET detector ring, as shown in FIG. 6 and FIG. 7, and as described herein. It can be appreciated that the single PET detector ring of FIG. 7 can be extrapolated to include any number of PET detector rings along an axial length of the PET scanner. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 7 shows an example of the arrangement of the PET scanner 8000, in which the object OBJ to be imaged rests on a table 9160 and the GRD modules GRD1 8001 through GRDN 8040 are arranged circumferentially around the object OBJ and the table 9160. The GRDs may comprise a PET detector ring and may fixedly-connected to a cylindrical bore 8050 that is fixedly-connected to a gantry 8060. The gantry 8060 houses many parts of the PET scanner. The gantry 8060 of the PET scanner also includes an open aperture, defined by the cylindrical bore 8050, through which the object OBJ and the table 9160 can pass, and gamma-rays emitted in opposite directions from the object OBJ due to an annihilation event can be detected by the GRDs and timing and energy information can be used to determine coincidences for gamma-ray pairs.

In FIG. 7, circuitry and hardware is also shown for acquiring, storing, processing, and distributing gamma-ray detection data. The circuitry and hardware include a processor 9070, a network controller 9074 303, a memory 9078, and a data acquisition system (DAS) 9076. The PET imager also includes a data channel that routes detection measurement results from the GRDs to the DAS 9076, the processor 9070, the memory 9078, and the network controller 9074. The DAS 9076 can control the acquisition, digitization, and routing of the detection data from the detectors. In one implementation, the DAS 9076 controls the movement of the table 9160. The processor 9070 performs functions including adjusting PET detector rings, pre-reconstruction processing of the detection data, image reconstruction, and post-reconstruction processing of the image data.

According to an embodiment, the processor 9070 of the PET scanner 8000 of FIG. 6 and FIG. 7 can be configured to perform any of the methods described herein, as well as variations thereof.

According to another embodiment, there may be fewer number of GRD modules, such as, for example, a single module.

In yet another embodiment, the DAS and memory functions are moved to multiple GRD modules, allowing some processing, including, for example the acquisition, digitization, and routing of the detection data to be performed in parallel by processors on each of the GRD modules.

As shown in FIG. 7, the processor 9070 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL. Verilog, or any other hardware description language and the code may be stored in an electronic memory directly within the FPGA or CPLD, or as a separate electronic memory. Further, the memory 9078 can be a hard disk drive, CD-ROM drive, DVD drive, FLASH drive, RAM, ROM or any other electronic storage known in the art. The memory 9078 may be non-volatile, such as ROM, EPROM, EEPROM or FLASH memory. The memory 9078 can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 9070 can execute a computer program including a set of non-transitory computer-readable instructions that perform the methods described herein, the program being stored in any of the above-described non-transitory computer-readable medium including electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a XENON® processor from Intel of America or an OPTERON® processor from AMD of America and an operating system, such as Microsoft VISTA®, UNIX, Solaris®, LINUX, Apple MAC-OS® and other operating systems known to those skilled in the art. Further, CPU can be implemented as multiple processors locally or in a distributed cloud configuration cooperatively working in parallel to perform the instructions.

In one implementation, the PET scanner may include a display for displaying a reconstructed image and the like. The display can be an LCD display, CRT display, plasma display, OLED, LED, or any other display known in the art.

The network controller 9074, such as an Intel Ethernet PRO network interface card from Intel Corporation of America, can interface between the various parts of the PET imager. Additionally, the network controller 9074 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including GPRS, EDGE, 3G, 4G and 5G wireless cellular systems. The wireless network can also be Wi-Fi, Bluetooth, or any other wireless form of communication that is known.

Obviously, numerous modifications and variations are possible in light of the above teachings. It is therefore to be understood that within the scope of the appended claims, the invention may be practiced otherwise than as specifically described herein.

The method and system described herein can be implemented in a number of technologies but generally relate to imaging devices and/or processing circuitry for performing the processes described herein. In an embodiment in which neural networks are used, the processing circuitry used to train the neural network(s) need not be the same as the processing circuitry used to implement the trained neural network(s) that perform(s) the methods described herein. For example, an FPGA may be used to produce a trained neural network (e.g. as defined by its interconnections and weights), and the processor 470 and memory 478 can be used to implement the trained neural network. Moreover, the training and use of a trained neural network may use a serial implementation or a parallel implementation for increased performance (e.g., by implementing the trained neural network on a parallel processor architecture such as a graphics processor architecture).

In the preceding description, specific details have been set forth. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) An image processing apparatus including, but not limited to: processing circuitry configured to: receive list-mode data corresponding to a plurality of detection times, generate a plurality of frames based on the list-mode data, assign at least one frame of the plurality of frames into a first frame group based on a similarity of each frame within the first frame group, assign at least one frame of the plurality of frames into a second frame group based on a similarity of each frame within the second frame group, estimate first and second frame group-specific reconstruction parameters based on (1) frames in first frame group and (2) frames in the second frame group, respectively, wherein the first and second frame group-specific reconstruction parameters are different, reconstruct a first set of frame data from any frame of the first frame group based on the first frame group-specific reconstruction parameter, and reconstruct a second set of frame data from any frame of the second frame group based on the second frame group-specific reconstruction parameter.

(2) The image processing apparatus according to (1), wherein the processing circuitry configured to estimate the first and second frame group-specific reconstruction parameters based on (1) frames in first frame group and (2) frames in the second frame group comprises processing circuitry configured to estimate the first and second frame group-specific reconstruction parameters based on (1) a last-in-time frame in first frame group and (2) a last-in-time frame in the second frame group.

(3) The image processing apparatus according to either (1) or (2), wherein the processing circuitry configured to estimate the first and second frame group-specific reconstruction parameters based on [1] frames in first frame group and [2] frames in the second frame group comprises processing circuitry configured to estimate respective frame group-specific reconstruction parameters from [1] a single frames for a frame group having only one frame, and [2] less than all frames for frame groups having more than one frame.

(4) The image processing apparatus according to any of (1) to (3) wherein the processing circuitry configured to estimate the first and second frame group-specific reconstruction parameters based on [1] frames in first frame group and [2] frames in the second frame group comprises processing circuitry configured to estimate respective frame group-specific reconstruction parameters from [1] a single frames for a frame group having only one frame, and [2] an average of plural frames for frame groups having more than one frame.

(5) The image processing apparatus according to any of (1) to (4), wherein the plurality of frames is a plurality of frames of crystal counts.

(6) The image processing apparatus according to any of (1) to (5), wherein the first and second frame group-specific reconstruction parameters are first and second frame group-specific scatter parameters.

(7) The image processing apparatus according to any of (1) to (6), wherein the first and second frame group-specific reconstruction parameters are first and second frame group-specific random event parameters.

(8) The image processing apparatus according to any of (1) to (7), wherein the plurality of frames is a plurality of pre-reconstruction data frames.

(9) The image processing apparatus according (8), wherein the plurality of pre-reconstruction data frames is a plurality of crystal count maps.

(10) The image processing apparatus according to either (8) or (9), wherein the plurality of pre-reconstruction data frames is a plurality of frames of sinogram data.

(11) The image processing apparatus according to any of (1) to (10), wherein the plurality of frames is a plurality of preview reconstruction frames without scatter correction.

(12) The image processing apparatus according to any of (1) to (11), wherein the processing circuitry configured to assign at least one frame of the plurality of frames into a first frame group based on the similarity of each frame within the first frame group, and assign at least one frame of the plurality of frames into a second frame group based on the similarity of each frame within the second frame group comprises processing circuitry configured to perform clustering to assign the at least one frame of the plurality of frames into the first frame group based on the similarity of each frame within the first frame group, and assign the at least one frame of the plurality of frames into the second frame group based on the similarity of each frame within the second frame group.

(13) The image processing apparatus according to any of (1) to (12), wherein the processing circuitry configured to perform clustering comprises processing circuitry configured to perform clustering using a neural network.

(14) The image processing apparatus according to any of (1) to (13) wherein the processing circuitry configured to assign at least one frame of the plurality of frames into a first frame group based on the similarity of each frame within the first frame group, and assign at least one frame of the plurality of frames into a second frame group based on the similarity of each frame within the second frame group comprises processing circuitry configured to produce a set of latent features from the plurality of frames and assign the at least one frame of the plurality of frames into the first frame group based on a similarity of latent features of the set of latent features of each frame within the first frame group, and assign the at least one frame of the plurality of frames into the second frame group based on a similarity of latent features of the set of latent features of each frame within the second frame group.

(15) The image processing apparatus according to any of (1) to (14), wherein the processing circuitry configured to assign at least one frame of the plurality of frames into a first frame group based on the similarity of each frame within the first frame group, and assign at least one frame of the plurality of frames into a second frame group based on the similarity of each frame within the second frame group comprises processing circuitry configured to: produce a set of latent features from the plurality of frames, cluster the set of latent features from the plurality of frames, assign the at least one frame of the plurality of frames into the first frame group based on the clustered latent features of the set of latent features of each frame within the first frame group, and assign the at least one frame of the plurality of frames into the second frame group based on the clustered latent features of the set of latent features of each frame within the second frame group.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Moreover, any of the elements of the appended claims may be used in conjunction with any other claim element. Rather, any limitations to embodiments of the invention are presented in the following claims.\

The invention claimed is:
1. An image processing apparatus, comprising:
processing circuitry configured to
receive list-mode data corresponding to a plurality of detection times,
generate a plurality of frames based on the list-mode data,
assign at least one frame of the plurality of frames into a first frame group based on a similarity of each frame within the first frame group,
assign at least one frame of the plurality of frames into a second frame group based on a similarity of each frame within the second frame group, estimate first and second frame group-specific reconstruction parameters based on (1) frames in the first frame group, and (2) frames in the second frame group, respectively, wherein the first and second frame group-specific reconstruction parameters are different, reconstruct a first set of frame data from any frame of the first frame group based on the first frame group-specific reconstruction parameters, and reconstruct a second set of frame data from any frame of the second frame group based on the second frame group-specific reconstruction parameters, wherein the processing circuitry is further configured to perform clustering using a neural network, and the processing circuitry is further configured to produce a set of latent features from the plurality of frames the set of latent features being extracted from the neural network, assign the at least one frame of the plurality of frames into the first frame group based on a similarity of latent features of the set of latent features of each frame within the first frame group, and assign the at least one frame of the plurality of frames into the second frame group based on a similarity of latent features of the set of latent features of each frame within the second frame group.

2. The image processing apparatus according to claim 1, wherein the processing circuitry is further configured to estimate the first and second frame group-specific reconstruction parameters based on (1) a last-in-time frame in the first frame group, and (2) a last-in-time frame in the second frame group.

3. The image processing apparatus according to claim 1, wherein the processing circuitry is further configured to estimate the respective frame group-specific reconstruction parameters from (1) a single frame for a frame group having only one frame, and (2) less than all frames for frame groups having more than one frame.

4. The image processing apparatus according to claim 1, wherein the processing circuitry is further configured to estimate the respective frame group-specific reconstruction parameters from (1) a single frame for a frame group having only one frame, and (2) an average of plural frames for frame groups having more than one frame.

5. The image processing apparatus according to claim 1, wherein the plurality of frames generated by the processing circuitry is a plurality of frames of crystal counts.

6. The image processing apparatus according to claim 1, wherein the first and second frame group-specific reconstruction parameters used by the processing circuitry are first and second frame group-specific scatter parameters.

7. The image processing apparatus according to claim 1, wherein the first and second frame group-specific reconstruction parameters used by the processing circuitry are first and second frame group-specific random event parameters.

8. The image processing apparatus according to claim 1, wherein the plurality of frames generated by the processing circuitry is a plurality of pre-reconstruction data frames.

9. The image processing apparatus according to claim 8, wherein the plurality of pre-reconstruction data frames generated by the processing circuitry is a plurality of crystal count maps.

10. The image processing apparatus according to claim 8, wherein the plurality of pre-reconstruction data frames generated by the processing circuitry is a plurality of frames of sinogram data.

11. The image processing apparatus according to claim 1, wherein the plurality of frames generated by the processing circuitry is a plurality of preview reconstruction frames without scatter correction.

12. The image processing apparatus according to claim 1, wherein the processing circuitry is further configured to perform clustering to assign the at least one frame of the plurality of frames into the first frame group based on the similarity of each frame within the first frame group, and assign the at least one frame of the plurality of frames into the second frame group based on the similarity of each frame within the second frame group.

13. The image processing apparatus according to claim 1, wherein the processing circuitry is further configured to:

produce a set of latent features from the plurality of frames, cluster the set of latent features from the plurality of frames, assign the at least one frame of the plurality of frames into the first frame group based on the clustered latent features of the set of latent features of each frame within the first frame group, and assign the at least one frame of the plurality of frames into the second frame group based on the clustered latent features of the set of latent features of each frame within the second frame group.

14. The image processing apparatus according to claim 1, wherein the plurality of frames are temporal frames, the first frame group and the second frame group are clustered with respect to the temporal frames.

15. The image processing apparatus according to claim 1, wherein the processing circuitry is further configured to:

generate a plurality of temporal frames based on the list-mode data, assign at least one temporal frame of the plurality of temporal frames into a first temporal frame group based on a similarity of each temporal frame within the first temporal frame group, assign at least one temporal frame of the plurality of temporal frames into a second temporal frame group based on a similarity of each temporal frame within the second temporal frame group, estimate first and second frame group-specific reconstruction parameters based on (1) temporal frames in the first temporal frame group, and (2) temporal frames in the second temporal frame group, respectively, wherein the first and second frame group-specific reconstruction parameters are different, reconstruct a first set of temporal frame data from any temporal frame of the first temporal frame group based on the first frame group-specific reconstruction parameters, and reconstruct a second set of temporal frame data from any temporal frame of the second temporal frame group based on the second frame group-specific reconstruction parameters.

16. The image processing apparatus of claim 1, wherein each frame includes frame data being a sinogram or a crystal count map, and the processing circuitry is further configured to assign the at least one frame into the first frame group based on a similarity of the sinogram or crystal count map of each frame within the first frame group.

17. An image processing method, comprising:

receiving list-mode data corresponding to a plurality of detection times;

generating a plurality of frames based on the list-mode data;

assigning at least one frame of the plurality of frames into a first frame group based on a similarity of each frame within the first frame group;

assigning at least one frame of the plurality of frames into a second frame group based on a similarity of each frame within the second frame group;

estimating first and second frame group-specific reconstruction parameters based on (1) frames in the first frame group, and (2) frames in the second frame group, respectively, wherein the first and second frame group-specific reconstruction parameters are different;

reconstructing a first set of frame data from any frame of the first frame group based on the first frame group-specific reconstruction parameters; and reconstructing a second set of frame data from any frame of the second frame group based on the second frame group-specific reconstruction parameters, wherein the method further comprises performing clustering using a neural network, and the method further comprises producing a set of latent features from the plurality of frames, the set of latent features being extracted from the neural network, assigning the at least one frame of the plurality of frames into the first frame group based on a similarity of latent features of the set of latent features of each frame within the first frame group, and assigning the at least one frame of the plurality of frames into the second frame group based on a similarity of latent features of the set of latent features of each frame within the second frame group.

18. A non-transitory computer-readable medium storing a program that, when executed by processing circuitry, causes the processing circuitry to perform an image processing method, comprising:

receiving list-mode data corresponding to a plurality of detection times;

generating a plurality of frames based on the list-mode data;

assigning at least one frame of the plurality of frames into a first frame group based on a similarity of each frame within the first frame group;

assigning at least one frame of the plurality of frames into a second frame group based on a similarity of each frame within the second frame group;

estimating first and second frame group-specific reconstruction parameters based on (1) frames in the first frame group, and (2) frames in the second frame group, respectively, wherein the first and second frame group-specific reconstruction parameters are different;

reconstructing a first set of frame data from any frame of the first frame group based on the first frame group-specific reconstruction parameters; and reconstructing a second set of frame data from any frame of the second frame group based on the second frame group-specific reconstruction parameters, wherein the image processing method further comprises performing clustering using a neural network, and the image processing method further comprises producing a set of latent features from the plurality of frames, the set of latent features being extracted from the neural network, assigning the at least one frame of the plurality of frames into the first frame group based on a similarity of latent features of the set of latent features of each frame within the first frame group, and assigning the at least one frame of the plurality of frames into the second frame group based on a similarity of latent features of the set of latent features of each frame within the second frame group.

* * * * *